UNITED STATES PATENT OFFICE.

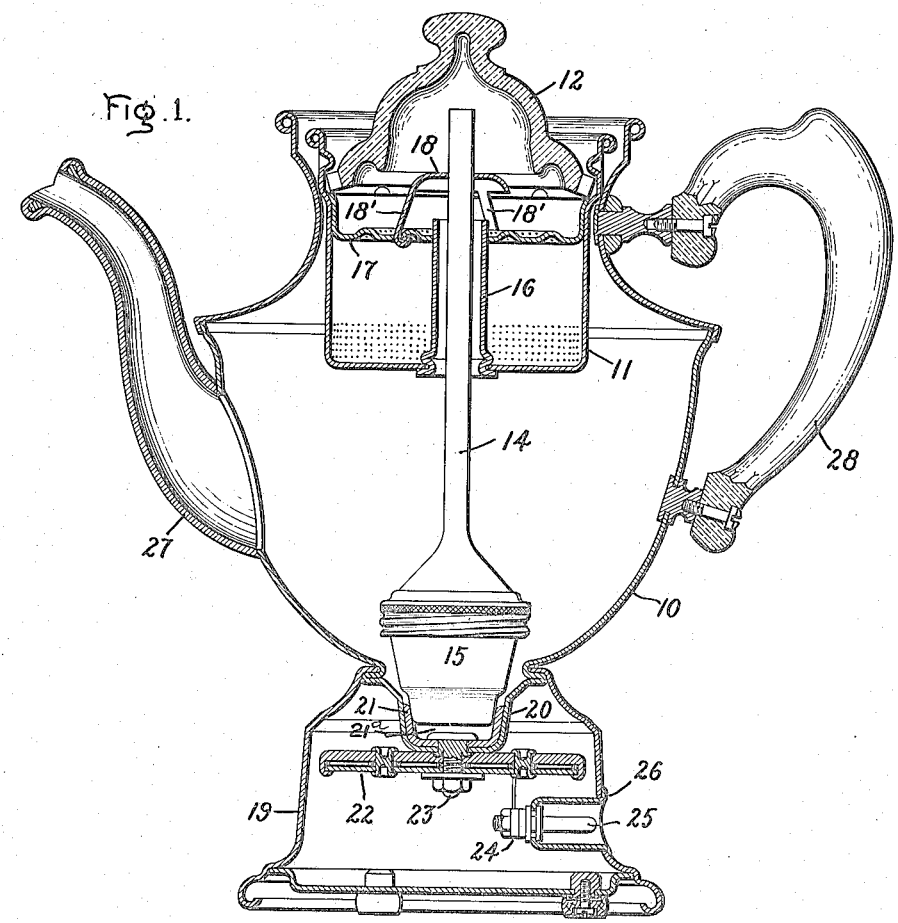
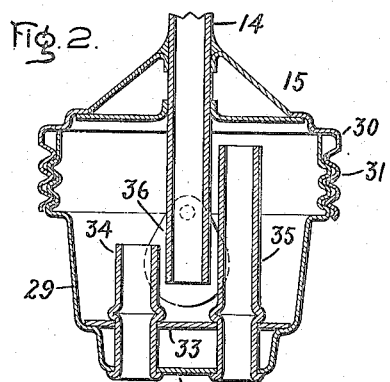
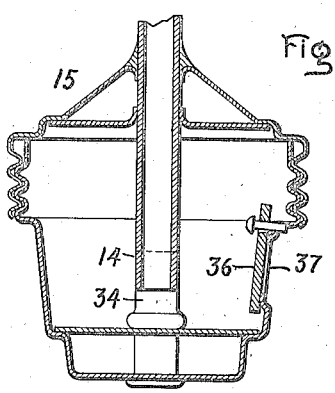

HENRY PRICE BALL, OF PITTSFIELD, MASSACHUSETTS, ASSIGNOR TO GENERAL ELECTRIC COMPANY, A CORPORATION OF NEW YORK.

ELECTRIC PERCOLATOR.

1,160,684.   Specification of Letters Patent.   Patented Nov. 16, 1915.

Application filed December 14, 1912.   Serial No. 736,708.

*To all whom it may concern:*

Be it known that I, HENRY PRICE BALL, a citizen of the United States, residing at Pittsfield, county of Berkshire, State of Massachusetts, have invented certain new and useful Improvements in Electric Percolators, of which the following is a specification.

My invention relates to percolators of that character in which an infusion is made by repeatedly circulating a body of liquid over a solid material and more particularly to the means for pumping the liquid from the reservoir constituting a part of the device over the solid material.

My invention is especially applicable to coffee percolators in which an infusion of coffee is made by circulating the heated liquid over the ground coffee which is held in a perforated retainer supported over a liquid reservoir. It is customary to pump the liquid from the reservoir up over the coffee in the retainer by means of steam which is generated by delivering a body of liquid from the reservoir to a heating member or other member which is heated to a comparatively high temperature. In devices which have been heretofore in use a body of liquid has been delivered to the heating member, a portion of which is converted into steam and the remainder forced by the said steam through a delivery tube up over the retainer. One objection to such an arrangement is that, as the temperature of the liquid in the reservoir rises, a greater proportion of the body of liquid which is delivered to the heating member is converted into steam with the result that, as the percolating operation progresses, the amount of liquid which is intermittently delivered to the coffee gradually decreases and the quantity of steam delivered increases. Most of the steam escapes to the outer atmosphere through the vents which must be provided and has no useful function. It has been found in some cases that after the percolating operation has progressed to a certain point practically all of the liquid which is delivered to the heating member is converted into steam and the percolating action is practically stopped.

My invention has for its object the insuring of the supply of the percolating liquid in at least as great quantities after the operation has continued for a reasonable length of time as at the beginning of such operation.

In carrying out my invention I utilize the usual arrangement of a liquid reservoir with a perforated retainer supported above the same and with a delivery tube extending from the reservoir through the retainer. In addition to the aforesaid parts I provide an improved means for forcing liquid from the reservoir through the delivery tube and over the retainer. This means is automatic and utilizes as the propelling agent the steam or vapor formed by bringing bodies of liquid from the reservoir into contact with a heating member at the bottom of the device. However, the arrangement is such that neither the said bodies of liquid nor any portions thereof are delivered through the delivery tube to the retainer. On the contrary the vapor which is generated through the contact of the said bodies with the heating member is utilized to force other and distinct bodies of liquid from the reservoir to the said retainer. The result of this is that as the percolating operation progresses there is no diminution in the quantity of liquid passed through the coffee. In fact there is an increase in the same because as the temperature of the liquid rises the period required to form the propelling body of steam decreases until as the boiling point is approached, an approximately continuous stream of liquid is forced from the reservoir over the coffee in the retainer.

A further object of my invention is to provide means for causing the cessation of the percolating action when the liquid in the percolator reservoir reaches its boiling point. It is recognized that it detracts from the flavor of coffee and also increases the injurious effects thereof to use boiling water in its preparation. This is because a much greater proportion of the tannin and caffein in the coffee is extracted by boiling water than by water below the boiling point. According to my invention the construction of the percolator pump is such the the ebullition of the water will cause the communication between the same and the percolator reservoir to remain open continuously thus relieving the pressure in the pump chamber and stopping the supply of liquid through the delivery tube to the retainer.

My invention will be more clearly understood by referring to the accompanying drawing in which I have shown one embodiment of the same.

In the said drawing Figure 1 is a vertical section of a coffee percolator embodying my invention; Fig. 2 is a vertical section of a portion of the percolator pump and Fig. 3 is a central vertical section at right angles to that shown in Fig. 2.

In Fig. 1 is shown a percolator comprising the vessel 10 constituting a liquid reservoir. The upper portion of the percolator may be of any well known construction. As shown in the drawing the perforated retainer 11 serving to hold the ground coffee is supported by the side wall of the vessel 10. The glass or other cover 12 is so shaped that it serves to spread the liquid which is delivered through the delivery tube 14 which is connected with the pump 15 in the bottom of the vessel 10. The tube 14 extends through a tube 16 of larger diameter mounted centrally in the retainer 11.

A strainer 17 is mounted in the top of the retainer and serves to prevent coffee grounds from passing from the retainer through the passage formed between the aforesaid tubes. A deflector 18 is supported on said strainer by lugs 18′ and the tube 14 extends slightly above said deflector and is held in position thereby. This deflector prevents liquid from passing directly from the tube back to the reservoir constituted by the vessel 10 and, with the top 12, serves to spread the liquid over the strainer 17. An accumulation of liquid on the retainer may overflow through the space between the tubes 14 and 16.

The vessel 10 is supported by the hollow base 19. A portion of the bottom of the vessel 10 is restricted in cross section and projects downwardly therefrom. This portion 20 serves as a "hot foot" in the bottom of which is seated a heating member 21 against which bodies of liquid may be delivered to generate vapor or steam. The receptacle 15 is seated against the heating member, the bottom thereof, together with the heating member, forming a chamber 21ª which communicates with the receptacle, as more fully hereinafter described. The said heating member is provided with a suitable heating means. As shown in the drawing this is an electrical heating means and comprises the electrical heat resistance stove 22 of the type disclosed in Logan Patent No. 957,226 and Smith Patent No. 962,793. The said stove may be supported directly by the said heating member through the bolt and nut connection 23. The resistance conductor of the said stove may be connected to suitable terminals 24 provided with terminal pins 25 adapted to receive a terminal plug of a form well known to the art. The said terminals may be located within the outer surface of the base 19 and surrounded by the casing 26. The percolator is provided with a spout such as 27 and a handle such as 28.

In Figs. 2 and 3 I have shown in detail the member 15 constituting a receptacle forming part of the pump which constitutes a part of my invention. This comprises a cup 29 which is provided with a suitable cap 30 connected to the same in any suitable manner as by means of the screw connection 31. The said cap 30 is centrally apertured to receive the delivery tube 14 which extends through the same into the cup 29. Supported by the bottom 32 of the cup 29 and preferably also by the false bottom 33 are tubes 34 and 35 which are preferably located on opposite sides of the tube 14. The object of the false bottom 33 is to form a heat insulating layer of air between the chamber formed in the receptacle 15 and the chamber located beneath the same. The tube 34 extends a slight distance above the bottom of the tube 14 while the tube 35 extends almost to the top of the chamber 15. In the side wall of the cup 29 is located the flap valve 36. This valve covers an aperture 37 in the said side wall which serves as a connection between the interior of the receptacle 15 and the rest of the reservoir formed by the vessel 10. The said valve 36 is adapted to open inwardly or to close according to the relative pressures on the outer and inner faces thereof. The aperture 37 is so located that upon the opening of the valve 36 the level of the liquid in the receptacle 15 will be raised above the upper end of the tube 34. As shown in the drawing the said aperture extends somewhat above the upper end of the said tube.

In operating my percolator the ground coffee is placed in the retainer 11 and the heating member 21 is heated by means of the electrical heating unit 22, a suitable amount of water having previously been placed in the reservoir 10. The level of the water in the cup 29 will gradually rise upon the filling of the reservoir 10. When the level of the water in the cup 29 reaches the open end of the tube 34, a body of water will flow through said tube into the chamber 21ª, when the water will be converted by the heating member into steam which will rise through the tubes 34 and 35 and exert a considerable pressure on the upper surface of the water contained in the receptacle 15. This will cause a body of liquid distinct from that which was previously admitted to the heating member 21 to be forced up through the delivery tube 14 against the cover 12 to be distributed over the strainer 17 and percolate through the ground coffee in the retainer 11 back to the reservoir 10. At the same time, the increase of pressure in the receptacle 15 will close the valve 36. As soon as the pressure within this is relieved by the expulsion of liquid the valve 36 will open and admit more water from the reservoir. This will cause more water to be delivered through the tube 34 to be converted into steam and the operation will proceed as before. As the heating progresses and the temperature of the liquid rises the interval required to convert into steam the bodies of the same dropped upon the heating member 21 will decrease. This will result in a corresponding decrease in the intervals between the delivery of the successive bodies of liquid to the retainer until a substantially continuous stream of liquid is delivered.

After the boiling point of the liquid in the reservoir is reached, the ebullition of the said liquid will prevent the vertically disposed flap valve 36 from seating and the forcing of liquid through the tube 14 will cease. This will result in a cessation of the percolating action.

It is apparent from the above description that from the time the percolating action starts until the boiling point of the liquid is approximated there is an increase rather than a decrease in the quantity of liquid delivered to the retainer and practically no steam finds its way from the pump to the upper portion of the percolator. Moreover the percolating action is automatically stopped when the boiling point of the liquid in the reservoir is reached.

Various changes and modifications of the above described structure will suggest themselves to those skilled in the art and are to be considered as coming within the scope of my invention as set forth in the following claims.

What I claim as new and desire to secure by Letters Patent of the United States, is:—

1. In a percolator, the combination of a liquid reservoir, a perforated retainer supported over said reservoir, a tube extending from a point above the bottom of said reservoir to a point above the bottom of said retainer, means for heating a body of liquid and generating steam pressure, and means responsive to said steam pressure for forcing a body of liquid distinct from the heated liquid through said tube.

2. In a percolator, the combination of a liquid reservoir, a perforated retainer supported over said reservoir, a tube extending from a point above the bottom of said reservoir to a point above the bottom of said retainer, means forming a chamber at the bottom of said reservoir, electrically-operated means for generating steam pressure therein, and means responsive to said steam pressure for forcing a distinct body of liquid through said tube to said retainer.

3. In a percolator, the combination of a liquid reservoir, a perforated retainer, means including a heating member forming a chamber, automatic means for delivering a quantity of liquid from said reservoir to said chamber, and means for utilizing the vapor thus generated to force another body of liquid from said reservoir to said retainer.

4. A percolator pump comprising a liquid receptacle having a delivery tube connected therewith, means including a heating member forming a chamber, automatic means for delivering a body of liquid from said receptacle to said chamber, and means actuated by the vapor thus generated for forcing another body of liquid from said receptacle through said delivery tube.

5. A percolator pump comprising a liquid receptacle, means including a heating member forming a chamber, a tube leading from said receptacle to said chamber, a delivery tube connected to said receptacle, means for supplying a body of liquid from said receptacle through said first-mentioned tube to said chamber, and means for utilizing the vapor thus generated to force another body of liquid through said delivery tube.

6. In a percolator, the combination of a liquid reservoir, a smaller receptacle connected thereto, said connection being adapted to be opened or closed according to the relative pressures on the respective sides thereof, means including a heating member forming a chamber, means for delivering a body of liquid from said receptacle to said chamber, and means for utilizing the vapor thus generated to force another body of liquid from said receptacle.

7. In a percolator, the combination of a liquid reservoir, a perforated retainer supported above the same, a liquid receptacle connected with said reservoir, said connection being controlled by a valve adapted to be opened or closed according to the relative pressures on the faces thereof, means including a heating member forming a chamber, means for supplying a body of liquid from said receptacle to said chamber, and means for utilizing the vapor thus generated to force another body of liquid from said receptacle to said retainer.

8. A percolator pump comprising a pump chamber having an opening in the side wall thereof, a vertically disposed valve covering said opening, a heating member disposed below said pump chamber and a conduit communicating with said pump chamber and extending from a point above the bottom to the outside thereof and toward said hot plate.

9. A percolator comprising a liquid reservoir, a perforated retainer located above the same, a receptacle communicating with said reservoir, a tube communicating with said receptacle and leading to a point above said retainer, means forming a steam generating chamber, and means furnishing communication between said chamber and said receptacle.

10. A percolator comprising a liquid reservoirvoir, a receptacle located in the lower part of said reservoir provided with a valve for permitting liquid to pass from the reservoir to the receptacle, a perforated retainer located above said reservoir, a tube extending from a point within said receptacle to a point above the bottom of said retainer, a heating member forming with the bottom of said receptacle a chamber, and a tube extending from said chamber to a point within the receptacle above the bottom of the tube which extends to the retainer.

11. A percolator comprising a liquid reservoir, a retainer located above the same, a pump comprising a receptacle provided with a valve admitting liquid from said reservoir to said receptacle, a tube extending from a point within said receptacle to a point above said retainer, a chamber separated from the reservoir and the receptacle, means for generating steam therein, means for conducting liquid from said receptacle to said chamber, and means for communicating the pressure generated in said chamber to the top of the liquid in said receptacle.

12. A percolator comprising a liquid reservoir, a retainer located above the same, a pump comprising a receptacle provided with a valve for pumping liquid from said reservoir to said receptacle, a tube extending from a point within said receptacle to a point above the bottom of said retainer, a chamber separated from the reservoir and the receptacle, means for generating steam therein and two tubes extending from said chamber to said receptacle and terminating in the receptacle at different heights.

13. In a percolator, a liquid reservoir, a retainer located above the same, a pump comprising a receptacle communicating with said reservoir and a tube communicating with said receptacle for conducting liquid to said retainer, means comprising a heating member for forming a chamber in which steam is generated, means for conducting liquid from said receptacle to said chamber, and means for utilizing the steam pressure to force the liquid from said receptacle to said retainer.

14. In a percolator, a liquid reservoir, a retainer located above the same, a pump comprising a receptacle communicating with said reservoir for conducting liquid to said retainer, means comprising a heating member for forming a chamber in which steam is generated, means for conducting liquid from said receptacle to said chamber, means for closing the communication between the reservoir and the receptacle in response to the steam generated within said chamber, and means for utilizing the steam pressure to force the liquid from said receptacle to said retainer.

In witness whereof, I have hereunto set my hand this 10th day of December, 1912.

HENRY PRICE BALL.

Witnesses:
H. B. DAVERIN,
M. J. REYNOLDS.